United States Patent Office 2,945,020
Patented July 12, 1960

2,945,020

METHOD OF FORMING FINE POLYETHYLENE POWDERS

Wade E. Hall, Millersville, Pa., assignor to Armstrong Cork Company, Lancaster, Pa., a corporation of Pennsylvania No Drawing. Filed Aug. 13, 1959, Ser. No. 833,403

7 Claims. (Cl. 260—94.9)

This invention relates generally to the forming of fine powders from polymeric substances and more particularly to the forming of fine polyethylene powders. Still more particularly the invention relates to the forming of fine polyethylene powders from polyethylene lumps without using mechanical attrition.

It has long been recognized that a material can usually be produced as a fine powder by dissolving it in a solvent, followed by pouring it into a nonsolvent for the material with agitation. In the case of polyethylene it is difficult to disperse the polyethylene in a solvent, since at any temperature at which the polyethylene is appreciably soluble, the particles tend to coalesce and become an intractable mass prior to solution.

This situation has been sufficiently widely recognized that various alternative procedures have been developed for forming fine powders of polyethylene. Such processes, however, all utilize a combination of solvent action and mechanical attrition. These processes are best exemplified by U.S. Patent 2,727,693—Carns, U.S. 2,858,299—Guzzetta, U.S. 2,451,743—Jarrett, and U.S. 2,870,113—Jones. It is apparent that there is a need for a process of reducing polyethylene to a fine powder without the use of attrition or mechanical grinding of any kind.

It is the primary object of the present invention to supply such a process. It is a further object of the present invention to supply a process whereby lumps of polyethylene may be reduced to an extremely fine powder of polyethylene simply by the action of solvents and nonsolvents on the polyethylene.

These objects are accomplished in a surprisingly straightforward and effective manner. The invention contemplates admixing relative proportions of 5-25 parts by weight polyethylene with 100 parts by weight of a solvent-nonsolvent mixture. The temperature of the mixture should be maintained at a temperature less than the melting point of the polyethylene and in the range of 80°-135° C. The resulting mixture of the polyethylene and the solvent-nonsolvent mixture is agitated in the above-stated temperature range for a period of 5-40 minutes to form the finely-divided polyethylene powder. The solvent-nonsolvent mixture consists essentially of 70-95% by weight of a hydrocarbon solvent for polyethylene selected from the group consisting of benzene, toluene, xylene, pentane, neopentane, hexane, cyclohexane, heptane, octane, and mixtures thereof. The balance of the solvent-nonsolvent mixture must be a polar, nonsolvent for polyethylene selected from the group consisting of methanol, ethanol, propanol, butanol, ethylene glycol, glycerol, acetone, methyl ethyl ketone, methyl isobutyl ketone, and mixtures thereof.

The invention is applicable to all polymers known as polyethylene having a molecular weight up to about 30,000. In particular, the polymers known as DYNH lend themselves peculiarly to the present process. The DYNH polymers are high temperature and high pressure polymers. Polyethylenes prepared under relatively low pressures and temperatures in the presence of a catalyst system are also suitable for use in the present process. Many of the usable polyethylenes are prepared by the method of U.S. 2,699,457—Ziegler et al.

The polyethylene in the form of lumps, chunks, pellets, flakes, or any convenient form, is placed in the solvent-nonsolvent mixture in an amount of 5-25 parts by weight polyethylene per 100 parts by weight of the solvent-nonsolvent mixture. Amounts smaller than the above-stated minimum are not feasible in view of the small amount of powder and large amount of solvent-nonsolvent mixture present. Amounts of polyethylene larger than the above-stated maximum inhibit the operation of whatever mechanism is at work in converting the polyethylene lumps to a fine powder.

The temperature at which the process is to be conducted must be less than that of the melting point of the polyethylene and will, in any case, be in the range of 80°-135° C. Elevated pressures will frequently be used at the higher temperatures in order to prevent boiling off of the normally liquid solvents and nonsolvents for polyethylene. Equilibrium pressure will normally be used at the higher temperatures.

The resulting mixture of the lumps of polyethylene and the solvent-nonsolvent mixture is maintained at a temperature within the range indicated above for a period of time of from 5-45 minutes. Agitation is maintained on the resulting mixture during this time. It must be emphasized that this agitation is of a relatively mild sort and does not at all amount to mechanical attrition or grinding. If atmospheric pressures are used, adequate agitation may be maintained by means of hand stirring with a glass stirring rod. The sole purpose of the agitation in the present process is to sweep the liquids over the surfaces of the polyethylene lumps, and any simple means will accomplish this purpose. Attrition is undesirable since it may cause agglomeration of the lumps or the powder.

The composition of the solvent-nonsolvent mixture is critical within certain limits. This mixture must contain between 70% and 95% by weight of a hydrocarbon solvent for polyethylene as named earlier. If the amount of hydrocarbon solvent is less than 70% by weight, the process does not expeditiously form the desired finely-divided powder of polyethylene. If the amount of hydrocarbon solvent for polyethylene is greater than 95% by weight of this mixture, the finely-divided polyethylene powder does not form at all.

It has been found that the nonsolvent for polyethylene which forms the second constituent in the solvent-nonsolvent mixture must be a strongly polar nonsolvent as listed earlier to be operable. The relatively volatile nonsolvents such as methanol will frequently be preferred over a relatively nonvolatile solvent such as ethylene glycol where the final product is to be a dry, powered polyethylene. This follows simply by virtue of the fact that the low boiling nonsolvents are far more easily removed from the powder than the high boiling nonsolvents. The same situation holds true for the solvent portion of the mixture.

One of the advantages of the present process over the prior processes for producing finely-divided polyethylene is that the present process lends itself to large-scale operations. For example the comminuting processes are all limited in size by the type of grinding equipment used. The present process, however, is limited only by the size of the container, vat, or autoclave for carrying out the mixing and heating operation, and may be readily utilized in amounts of 5,000 gallons and up.

The resulting finely-divided polyethylene in dry powder form may be used to coat metal drums, buckets, and the like by placing the powder inside the vessel to be coated, heating the vessel from the outside, and rolling the vessel to coat the interior. In addition, the dispersion of finely-divided polyethylene in the solvent-nonsolvent mixture may itself be dispersed in water so that it does not separate immediately. This dispersion may be utilized directly in wax suspensions for coating floors and other surfaces.

The following examples illustrate the invention.

*Example 1*

Into a low pressure reactor are placed 630 parts petroleum ether ($C_5$–$C_6$ hydrocarbons), 70 parts methanol, and 70 parts of ⅛" polyethylene pellets (Bakelite DYNK). The system was heated with gentle agitation at 100° C. for 40 minutes under an equilibrium pressure of about 100 pounds per square inch.

The polyethylene pellets were converted into a sufficiently fine polyethylene powder that the powder settled out of the solvent-nonsolvent mixture only after appreciable standing.

*Example 2*

Example 1 was repeated using the following amounts of petroleum ether and methanol:

| Run No. | Petroleum Ether, Parts | Methanol, Parts |
|---|---|---|
| 1 | 420 | 280 |
| 2 | 490 | 210 |
| 3 | 560 | 140 |
| 4 | 630 | 70 |

Run 1 agglomerated badly, and run 2 agglomerated slightly. Runs 3 and 4 produced excellent finely-divided polyethylene.

Run 4 was repeated using 350 parts polyethylene pellets. No finely-divided polyethylene was formed.

*Example 3*

Example 1 is repeated using the following solvents and nonsolvents for polyethylene in the amount indicated to form the solvent-nonsolvent mixture. The runs (except No. 7) are all carried out at 100° C. under equilibrium pressure.

| Run No. | Solvent, Parts | Nonsolvent, Parts |
|---|---|---|
| 5 | cyclohexane, 630 | ethanol, 70. |
| 6 | benzene, 630 | acetone, 70. |
| 7 | cyclohexane, 665 | butanol, 35. |
| 8 | octane, 560 | methyl ethyl ketone, 140. |
| 9 | xylene, 630 | ethylene glycol, 70. |

The ethylene glycol is removed from the finely-divided powder resulting from run 9 only with great difficulty after repeated washing with water and drying. All runs produce finely-divided polyethylene.

Run 7 is conducted at 80° C. with gentle agitation for 45 minutes.

I claim:

1. A method for reducing the particle size of polyethylene which comprises admixing relative proportions of 5–25 parts by weight polyethylene at a temperature less than the melting point of the polyethylene in the range of 80°–135° C. with 100 parts by weight of a solvent-nonsolvent mixture, and agitating the resulting mixture at said temperature for a period of 5–45 minutes to form finely-divided polyethylene, said solvent-nonsolvent mixture consisting essentially of 75%–95% by weight of a hydrocarbon solvent for polyethylene selected from the group consisting of benzene, toluene, xylene, pentane, neopentane, hexane, cyclohexane, heptane, octane and mixtures thereof, the balance being a polar nonsolvent for polyethylene selected from the group consisting of methanol, ethanol, propanol, butanol, ethylene glycol, glycerol, acetone, methyl ethyl ketone, methyl isobutyl ketone, and mixtures thereof.

2. The method according to claim 1 conducted at 100° C.

3. The method according to claim 1 wherein said solvent-nonsolvent mixture contains 90% by weight of a hydrocarbon solvent for polyethylene.

4. The method according to claim 1 wherein said hydrocarbon solvent for polyethylene consists of petroleum ether.

5. The method according to claim 1 wherein said polar nonsolvent for polyethylene consists of methanol.

6. The method according to claim 1 wherein said solvent-nonsolvent mixture comprises petroleum ether and methanol.

7. The method according to claim 6 wherein said solvent-nonsolvent mixture contains 90% by weight petroleum ether and 10% by weight methanol.

No references cited.